Oct. 27, 1964     A. W. TOWNSEND     3,154,333
BALL-AND-SOCKET JOINTS
Filed Aug. 16, 1962
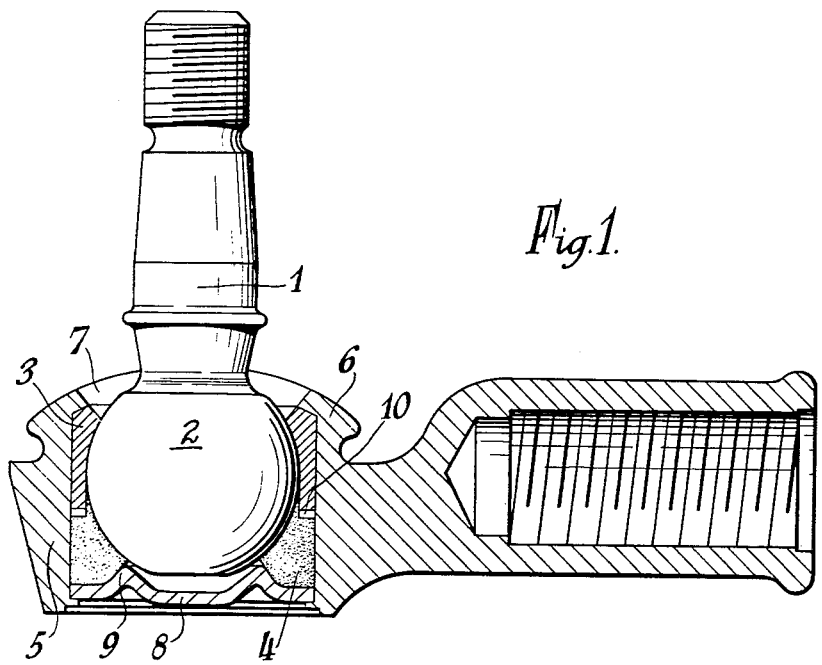
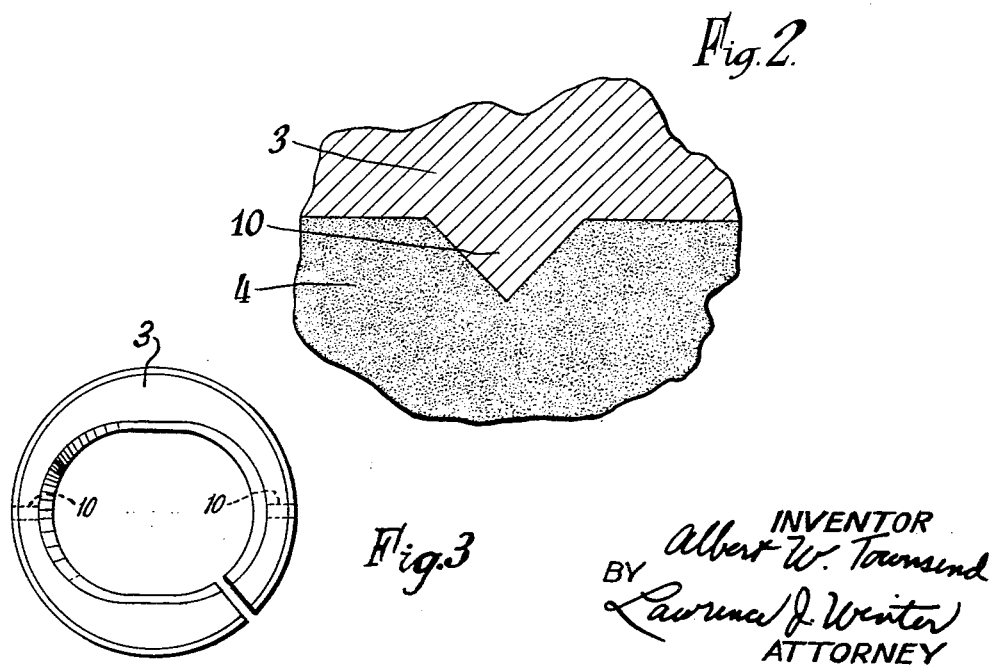
INVENTOR
Albert W. Townsend
BY Lawrence J. Winter
ATTORNEY

3,154,333
BALL-AND-SOCKET JOINTS

Albert W. Townsend, Leamington Spa, England, assignor to Automotive Products Company Limited, Leamington Spa, England
Filed Aug. 16, 1962, Ser. No. 217,354
4 Claims. (Cl. 287—87)

This invention relates to ball-and-socket joints of the kind commonly used in the steering linkage of motor vehicles and for like purposes, and has for its object to provide an improved joint.

According to the invention, a ball-and-socket joint comprises a ball pin with a spherical head housed between two ring-shaped members in a cylindrical socket, one ring-shaped member being a bearing member formed of nylon, polyurethane or other synthetic plastic material and the other being a pad of compressed woven textile material impregnated with a lubricant, the ring-shaped members being retained between an internal shoulder at one end of the socket and a closure cap secured in position in the other end thereof, the resilience of the pad exerting pressure on the head of the ball pin to compensate for wear of the said head and the bearing member.

Preferably, the synthetic plastic bearing member is formed with protuberances on the face thereof which abuts against the pad, the said protuberances embedding themselves in the woven fabric and restraining the synthetic plastic bearing member against rotation.

In order that the invention may clearly be understood and carried into effect the same will now be described by aid of the accompanying drawings in which:

FIGURE 1 is a section through a ball-and-socket joint according to the invention.

FIGURE 2 is a fragmentary view in section and to an enlarged scale, showing one form of protuberance on the bearing member the protuberance being shown embedded in the woven fabric.

FIGURE 3 is a top plan view of the bearing member embodied in the invention.

As shown in FIGURE 1 the ball-and-socket joint comprises a ball pin 1 with a spherical head 2 housed between two ring shaped members 3 and 4 in the cylindrical socket 5. The ring shaped member 3 is a bearing member formed of nylon, polyurethane or other synthetic plastic material, the ring shaped member 4 being a pad of compressed woven textile material impregnated with a lubricant.

The bearing member 3 engages with an internal shoulder 6 at one end of the cylindrical socket, the stem of the ball pin 1 protruding through the opening 7 surrounded by the said shoulder, and the pad 4 is pressed into the other end of the socket, around the ball head, being held in position by a metal disc 8 retained in the mouth of the socket by peening over the edge of the latter. The metal disc 8 is formed with an annular rib 9 on its inner side which approaches close to the ball head, and restrains the pad 4 against radial inward expansion.

The bearing member 3 is provided with one, two or more protuberances 10, on its annular face which is in contact with the pad, so that the two are held against relative rotation. The pad 4 is found to resist rotation in the socket, and thus also holds the bearing member 3 against rotation. As shown in the drawings the protuberances extend radially and have a V cross-section as seen particularly in FIGURE 2. The protuberances can however be of any desired form.

The pad 4 has some degree of resilience, and exerts pressure on the head 2 of the ball pin 1, so that it tends to compensate for wear of the said head and of the bearing member. Moreover, the lubricant with which the pad is impregnated is transferred to the head of the ball pin and so lubricates the bearing.

The ring-shaped bearing member 3 may be in one piece or may be split to provide at least two arcuate portions, and preferably has an oval hole for the passage of the ball pin, since these joints are frequently required to have a greater angular movement in one plane than in a plane at right angles thereto, and the largest convenient bearing area is desirable.

I claim:
1. A ball and socket joint comprising a cylindrical housing forming a socket, a ball pin with a spherical head disposed in said socket, a first synthetic plastic ring shaped bearing member disposed in said socket between said head and the inner surface of said housing, a second ring shaped bearing member disposed in said socket between said head and said inner surface, said second ring member consisting of a resilient pad of compressed woven textile material impregnated with a lubricant, said ring members having substantially flat parallel facing surfaces in contact with each other, an internal shoulder adjacent one end of said socket and a closure cap adjacent the other end of the socket retaining said ring members in contact with each other and with said head, said plastic ring member having circumferentially spaced protuberances on its face in contact with said pad ring member, said protuberances extending into and embedded below the surface of said abutting surface of said pad ring member to restrain said first ring member from rotation with respect to said second ring member.

2. The joint of claim 1 wherein said protuberances extend in a radial direction with respect to the longitudinal axes of said housing and ball pin, and said protuberances are V-shape in cross section.

3. The joint of claim 2 wherein said first ring member consists of nylon.

4. The joint of claim 2 wherein said closure cap consists of a flat outer rim with a V-shape annular rib centrally thereof projecting into said second ring and bearing thereagainst to restrain said second ring against radial inwardly expansion.

References Cited in the file of this patent

UNITED STATES PATENTS

| | | |
|---|---|---|
| 1,881,601 | Hufferd et al. | Oct. 11, 1932 |
| 2,591,832 | Kogstrom | Apr. 8, 1952 |
| 2,921,809 | Kogstrom | Jan. 19, 1960 |
| 2,973,980 | Vogt et al. | Mar. 7, 1961 |
| 3,004,786 | Herbenar | Oct. 17, 1961 |
| 3,073,634 | Gottschald | Jan. 15, 1963 |

FOREIGN PATENTS

| | | |
|---|---|---|
| 840,176 | Great Britain | July 6, 1960 |

OTHER REFERENCES

Engineering Prod., 855,414, November 30, 1960.